May 7, 1968     F. W. STEERE, JR     3,381,999

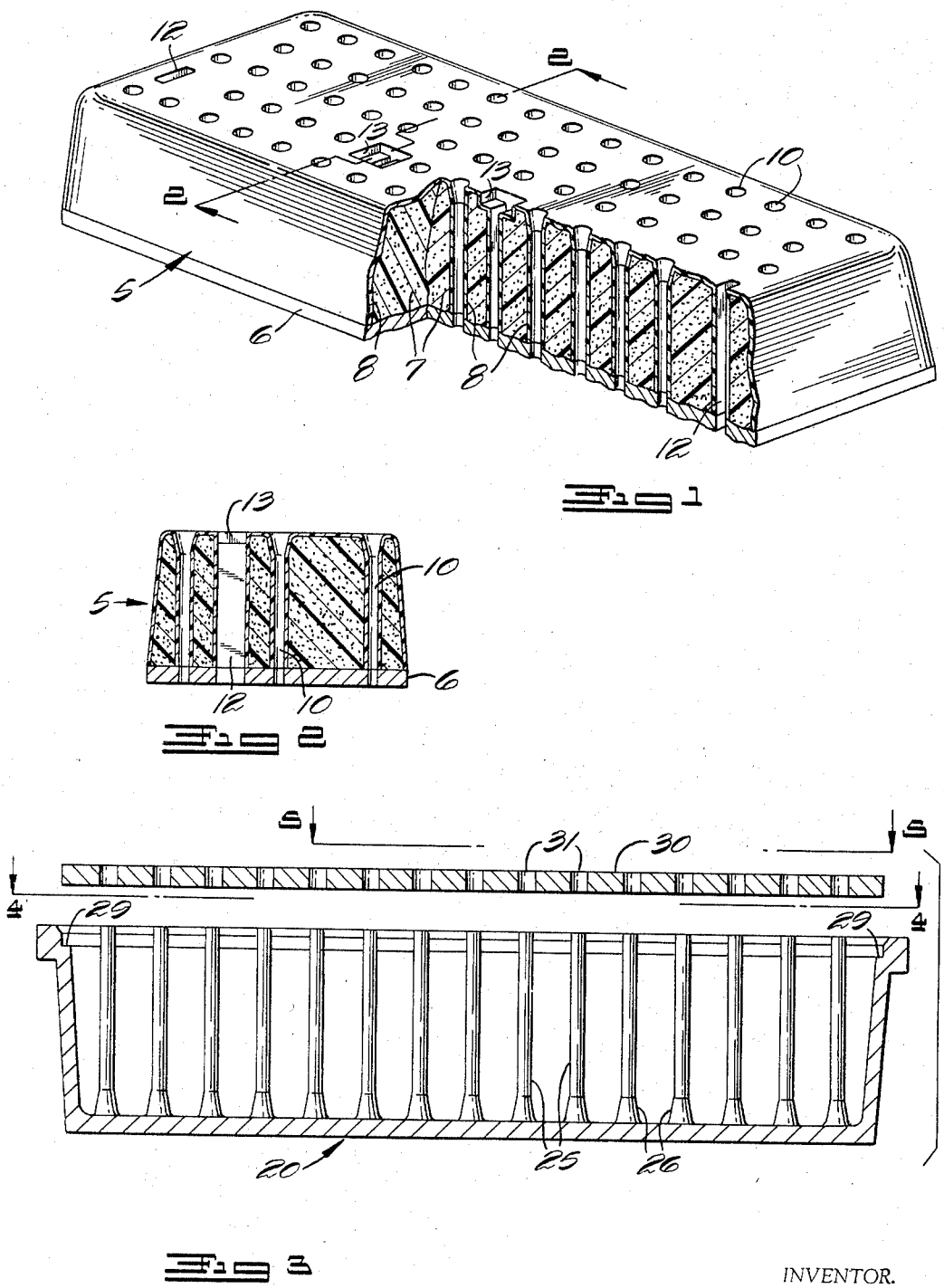

CUSHION AND SKIN COVERING THEREFOR

Filed Aug. 4, 1966     5 Sheets-Sheet 2

INVENTOR.
FRANK W. STEERE, JR.
BY
ATTORNEY

May 7, 1968  F. W. STEERE, JR  3,381,999
CUSHION AND SKIN COVERING THEREFOR
Filed Aug. 4, 1966  5 Sheets-Sheet 3
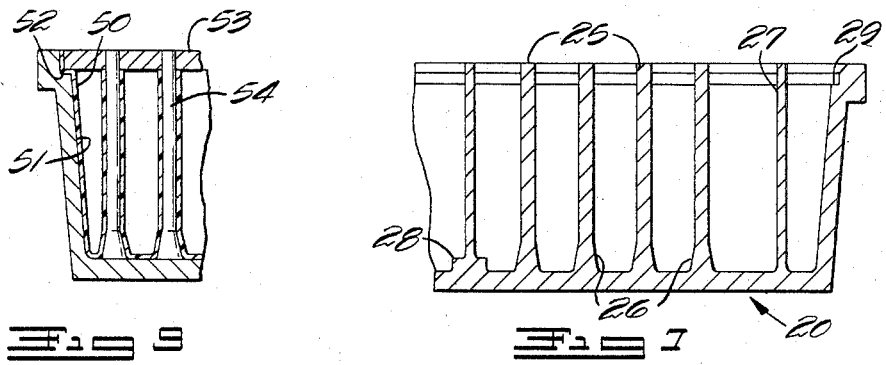
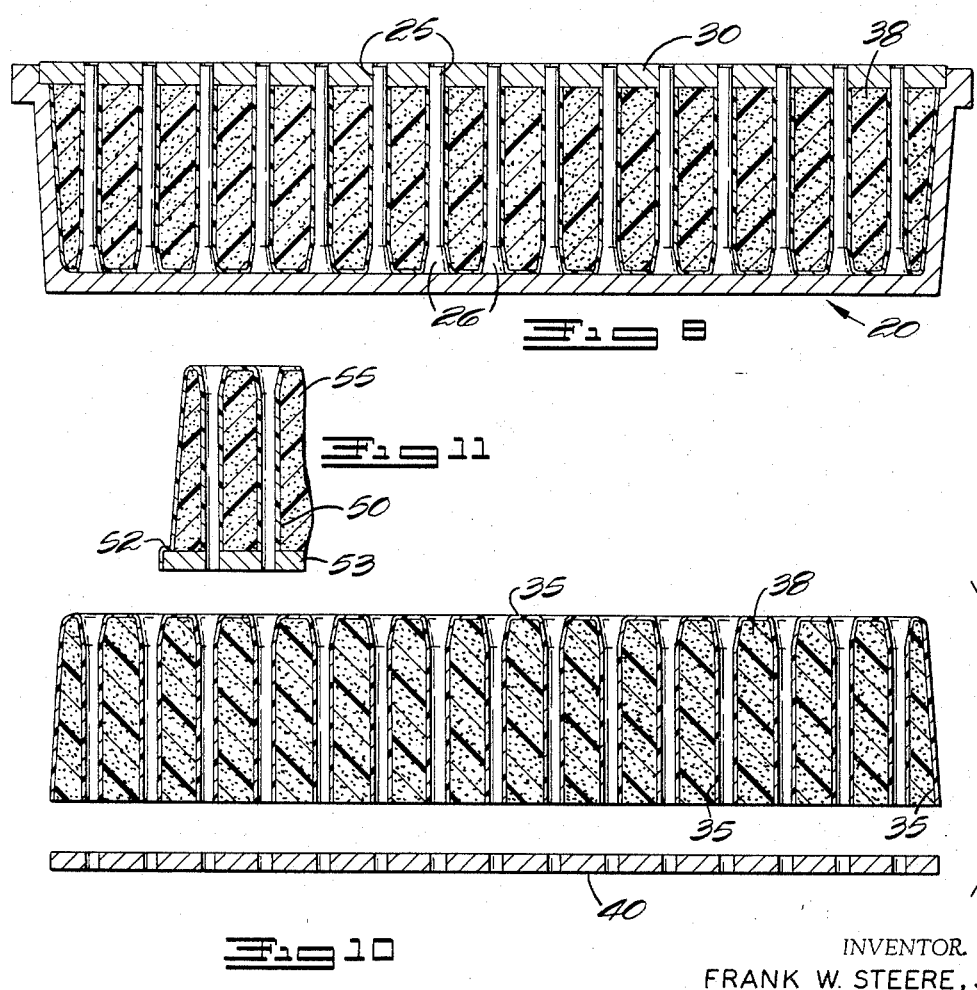
INVENTOR.
FRANK W. STEERE, JR.
BY
ATTORNEY May 7, 1968    F. W. STEERE, JR    3,381,999
CUSHION AND SKIN COVERING THEREFOR
Filed Aug. 4, 1966    5 Sheets-Sheet 4

INVENTOR.
FRANK W. STEERE, JR.
BY
ATTORNEY

May 7, 1968 F. W. STEERE, JR 3,381,999
CUSHION AND SKIN COVERING THEREFOR
Filed Aug. 4, 1966 5 Sheets-Sheet 5

INVENTOR.
FRANK W. STEERE, JR.
BY
ATTORNEY

United States Patent Office 3,381,999
Patented May 7, 1968

3,381,999
CUSHION AND SKIN COVERING THEREFOR
Frank W. Steere, Jr., 810 Merriman Road,
Akron, Ohio 44313
Filed Aug. 4, 1966, Ser. No. 570,349
19 Claims. (Cl. 297—453)

ABSTRACT OF THE DISCLOSURE

A cushion, with one or more openings for ventilation, etc. extending completely through it, is made of sponge or other resilient filler covered with a one-piece flexible plastic skin which may be produced by either dip molding, rotational casting or slush molding, etc. The openings may continue through the cushion support. The skin includes the top, usually the side wall or walls, and at least the top portion of the wall surrounding each of the one or more openings. The sponge is preferably foam which may be formed in the skin. The cushion for an automobile includes one or more openings for a seat belt, and the cushions for the seat and back of a chair include one or more openings to accommodate the arms, etc. The invention includes the skin, the cushion and products utilizing such a cushion.

---

This invention relates to a ventilated cushion or other cushion with one or more openings extending through it, and its manufacture. The cushion can be used in vehicles such as passenger automobiles and buses, but may also be used on bar stools and furniture for the office, theater and the home and wherever such a cushion is desired.

The cushions of this invention are made of a resilient filler, usually sponge, with openings through it. The sponge or other filler may be of any resilient type and will usually be a sponge of a synthetic elastomer, although it may be made of natural rubber. It may be a chemically blown sponge or a sponge made from foamed latex. The top of the sponge or other filler, and usually also the sides and the walls of the openings through the sponge or filler are covered with a formed sheet referred to herein as a skin. This skin is preferably in a single piece which exactly fits the sponge and is adhered to it. The sponge and skin may be formed separately and then united, or the sponge may be formed in the skin. For instance, the skin may be made by one manufacturer and shipped to another manufacturer for filling with sponge.

Usually, the cushion includes a rigid base of metal or wood or the like in which there are openings which coincide with the openings through the filler of the cushion. In a ventilated cushion openings are desirable in the base, to permit unobstructed ventilation and incidentally so that any jewelry, change or other valuable material accidentally spilled on the cushion and entering the openings will fall throuhg the cushion and not be caught in it. Also bottoms which would collect dust and dirt are thus avoided.

In a preferred form of cushion for a passenger automobile, two of the openings at the side edges of a cushion large enough for only a single passenger (or four openings in a cushion for two passengers) are narrow with substantially parallel sides and normally substantially parallel to said edges of the cushion, to accommodate straps for a seat belt, and the top of at least one of every such pair of openings may be enlarged to form a pocket to receive a seat-belt buckle. The buckle should be wider than the strap so that it does not fall through the opening which is large enough for the strap, and this opening, too, may be widened at the top to accommodate the hasp, or another arrangement will be used to prevent the strap and hasp falling through the opening. It is equally possible in an automobile seat cushion or other cushion to provide openings for supports for a tray, a writing desk, etc. Openings for other purposes may be formed through the cushion such as the arms of a chair or a support for a tray or reading stand, etc.

The skin may be made by molding, and the description herein refers more particularly to such a method of forming the skin. However, it may be formed by any other suitable procedure. For instance, it may be formed by a dipping procedure, followed, if required, by curing or other desirable processing steps. A pattern can be produced on the cushion by dipping a patterned form in a suitable plastic composition and thereafter turning the dipped skin inside out, to expose the patterned surface.

The drawings in which the ventilation openings are oversize, are illustrative.

FIGURE 1 is an isometric view of a cushion for two passengers in a vehicle;

FIGURE 2 is a transverse section on the line 2—2 of FIGURE 1;

FIGURE 3 is a sectional exploded view through a mold for this cushion;

FIGURE 7 is a sectional view on the lines 7—7 of FIGURE 4;

FIGURE 8 is a sectional view through the mold filled with foam, and the skin between the foam and the mold;

FIGURE 9 is a modification of FIGURE 8 in which the skin covers the wall of the mold up to the top;

FIGURE 10 is a sectional exploded view of the cushion and base;

FIGURE 11 is a section of an edge portion of a completed cushion formed from a base and the skin-covered foam made in the mold of FIGURE 9;

Figure 4:
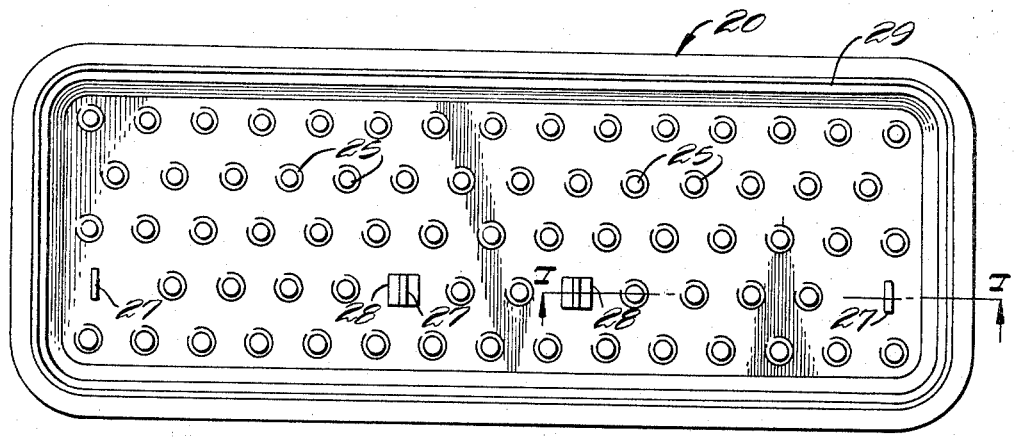
FIGURE 4 is a plan view of the mold on the line 4—4 of FIGURE 3.
Figure 5:
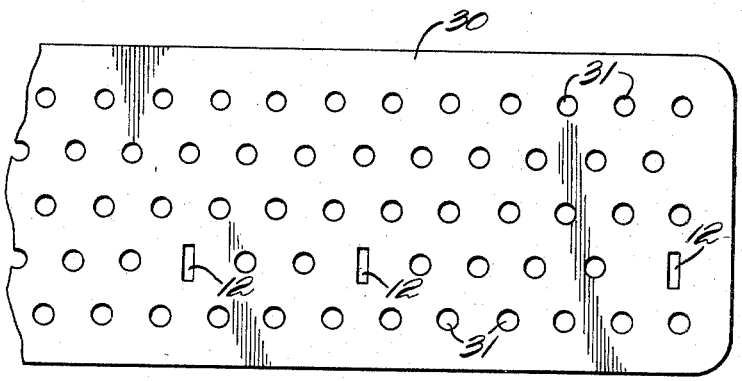
FIGURE 5 is a partial plan view of the mold cover on the line 5—5 of FIGURE 3.

In the drawing (FIGURE 1), the cushion 5 is formed of base 6 and foam 7 which is covered with flexible plastic skin 8. The openings 10 may be of any shape but are advantageously circular in cross section. Two openings 12, rectangular in cross section, are provided near the edges of the cushion which are parallel to the edges. These openings are for seat belts. Two other openings near the middle are of similar cross section in their lower portions to accommodate seat belts, and their upper ends widen at 13 to form pockets to accommodate seat-belt buckles. The openings 12 may widen at the top to support the hasp for a seat-belt buckle which is made wider than the belt, to prevent the belt falling through the openings. The pocket 13 will usually be deep enough to contain the buckle so that a person can sit over it without knowing it is there. The wall of the pocket need not conform exactly to the shape of the buckle.

The cores or posts 25 are shaped to form openings of the desired contour in the mold 20. They may be flared at 26 to widen the mouths of the openings at the top of the cushion. FIGURE 7 shows posts 27 to form openings for seat belts and enlargements 28 to form pockets for the buckles.

The wall of the mold 20 is provided with a ledge 29 to support the cover 30. A cover is not essential. The posts 25 need not extend above the level of the edge 29, and the cover may be simply a flat board. The cover 30 is shown as provided with openings 31 to fit over the posts.

Figure 6:
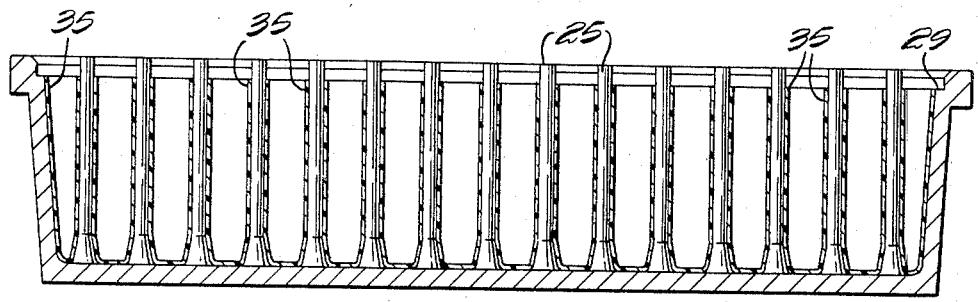
FIGURE 6 is a sectional view of the mold with its inner surfaces covered with a skin of flexible plastic which is to form a covering for the cushion.

According to a preferred method of forming a cushion in this mold 20, the mold is filled with the skin-forming material to the level of ledge 29, or a smaller amount may be placed in the mold and swished around or otherwise agitated to cover these walls. It is desirable that the skin form on the posts, but it may cover only the portions of the posts adjacent the top of the cushion. A vinyl plastisol is usually employed although another plastic may be used in liquid or powder form. The mold is heated to cause a deposit of plastic on the mold. Then excess plastic is removed from the mold by pouring it out or sucking it out or in any other manner. Rotational casting also may be used. FIGURE 6 shows the mold with the plastic skin 35 on the wall of the mold 20 and on the posts.

Foamed or foamable plastic, usually foamed latex (e.g. polyurethane) is now added to the mold. It may contain a volatile foaming ingredient, such as a gas-forming fluoro-hydrocarbon; or a finely divided gas-forming ingredient such as ammonium carbonate may be used. Heat is supplied as required. The foam 38 fills the mold. If it does not form a good bond with the skin the skin may be first covered with a suitable adhesive. Polyurethane foam forms a good bond with vinyl skin, no adhesive being necessary. The cover 30 may form the base for the cushion. A separate base 40 (FIGURE 10) may be used. It may be desirable to apply an adhesive to its under surface before placing it on the mold to secure a firm bond of the foam to the base. The base may be wood, metal, plastic or the like. A base integral with the foam is not necessary. Valve means for entrance and expulsion of air from the cushion may be provided in the base or the skin covering.

As an alternative procedure, the sponge may be separately molded or it may be cut from a slab of sponge, e.g., polyurethane foam, by hot-wire cutting or other means.

In the modification of the preferred procedure shown in FIGURE 9, the skin 50 is made to cover the wall 51 above the ledge 52 for the cover 53. The posts 54 are only the height of the ledge. The cover 53 may serve as the base, as in FIGURE 11 which shows a portion of the finished cushion. The foam 55 is filled into the mold after the wall has been covered with the skin, as shown in FIGURE 9. The chief difference between this cushion and that shown in FIGURE 1 is that the film covering extends down over the perimeter of base 53 whereas in the cushion of FIGURE 1 the edge of the base is bare, although it may be covered with an embossed metal strip or the like.

As a person shifts his position on the ventilated cushion, the openings through the cushion provide for circulation of the air between the person and the top of the cushion. It is not necessary for air to be sucked in from the edge of the cushion and expelled over the edge, but it can be drawn up through the openings in the cushion and expelled through these, and thus cause fresh air to circulate in the immediate vicinity of the tops of some of the openings without causing air circulation over the entire surface of the cushion. By any such circulation of the air, the cushion surface is cooled.

Figure 12:
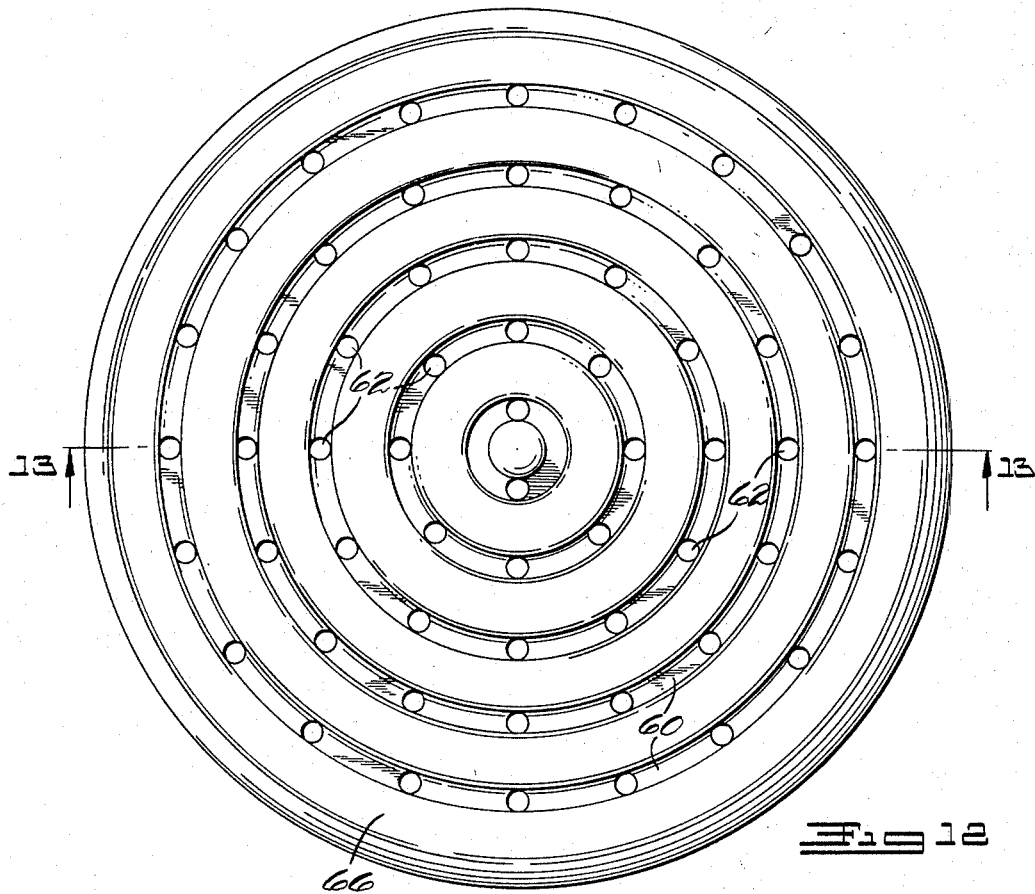
FIGURE 12 is a plan view of a round cushion with vent grooves in the top of the cushion connecting the openings through the foam.
Figure 13:
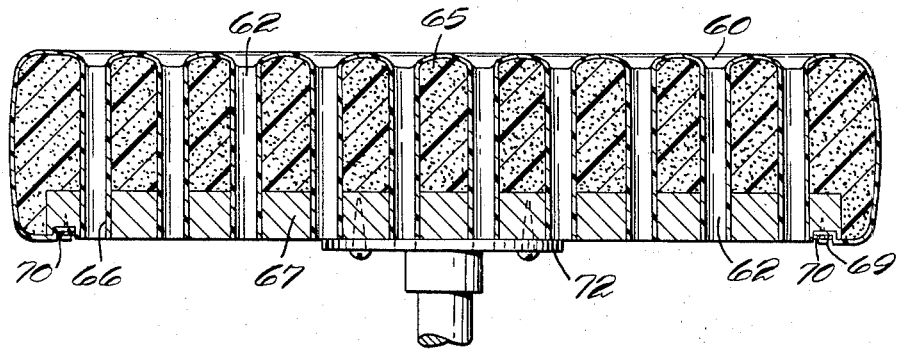
FIGURE 13 is a sectional view through the cushion on a bar-stool support.

Further provision for air circulation is provided in the cushion of FIGURES 12 and 13. The vent grooves 60 in the surface of the cushion connect the openings 62 which extend through the cushion, so that air circulation is possible even though the person remains in one position. Slight shifting of the person's weight causes the air to circulate in and out of openings 62 and through grooves 60 over the top of the cushion. The cushion comprises the foam 65, the skin covering 66 and the base 67. The edge of the skin 66 extends beyond the foam and is drawn over the base into the groove 69 where it is held by the metal strip 70 which is tacked in place.

This cushion is shown as fastened to the top of a bar stool or the like. Openings in flange 72 and base coincide with the bottoms of openings 62 through the cushion.

Figure 14:
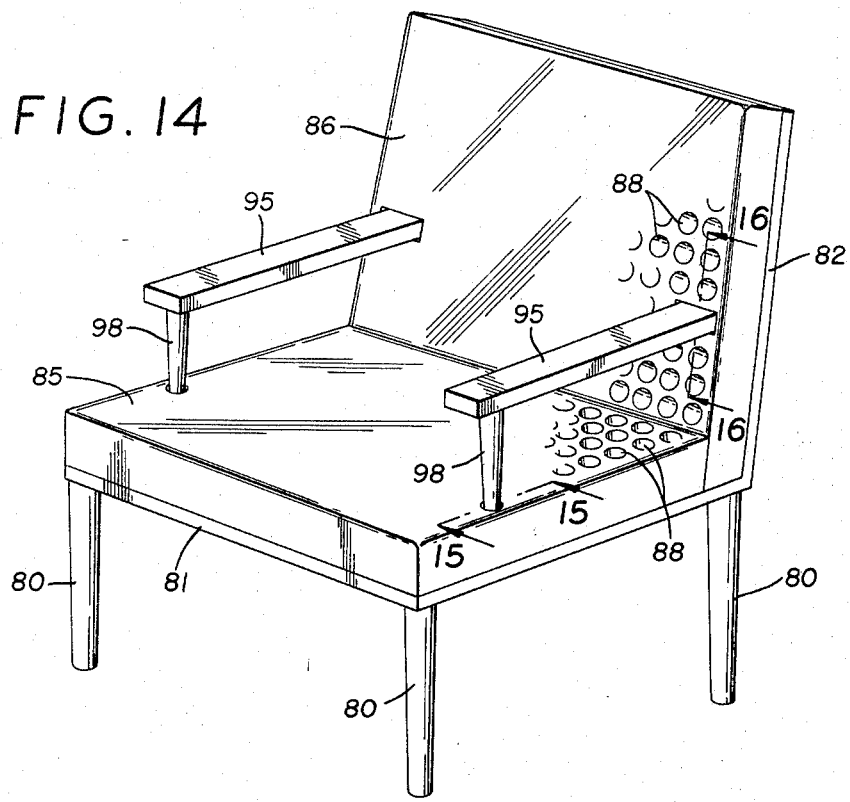
FIGURE 14 is a view of an arm chair upholstered with foam, with openings in the foam cushion for arms and supports for the arms.
Figure 15:
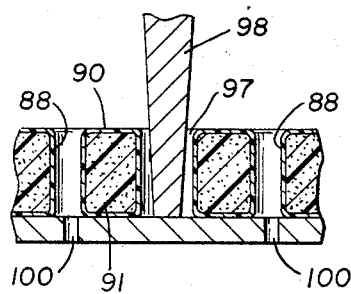
FIGURE 15 is a section on the line 15—15 of FIGURE 14.
Figure 16:
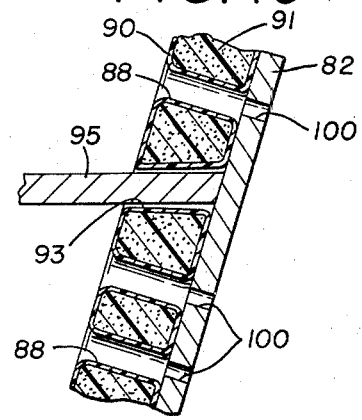
FIGURE 16 is a section on the line 16—16 of FIGURE 14.

FIGURES 14 to 16 illustrate a chair with wooden or metal feet 80, seat 81 and back 82 which are covered with plastic sponge seat cushion 85 and back cushion 86 each of which cushions is provided with ventilation openings 88. The edges of the cushions substantially coincide with the perimeters of the seat and back. A plastic skin covering 90 encloses the sponge 91 and lines the openings. Additional openings 93 in the back cushion accommodate arms 95, and openings 97 in the seat cushion accommodate the supports 98 for the arms. The arms and their supports are fastened to the back and seat in any appropriate manner. Openings 100 in the seat 81 and 82 coincide with the openings 88 to provide for ventilation.

The cushions may be of any shape. They may be designed to fit bucket seats in automobiles. They may cover the backs and sides of a chair or the like. They may be any color. Any skin covering may be used, applied in any convenient manner.

The invention is covered in the claims which follow.

I claim:
1. A cushion composed of a resilient filler, one or more openings extending completely through the filler, and a conforming skin which is an integral unit distinct from the filler and is continuous over the top of the filler and extends at least part of the way down the walls of the one or more openings from the top, the bottoms of such extensions into the one or more openings being open ended.

2. The cushion of claim 1 in which there are a plurality of openings distributed through the cushion for ventilation with the integral skin extending at least part of the way down into each.

3. The cushion of claim 1 in which the filler is a sponge and the integral skin covers the sides of the sponge.

4. The cushion of claim 1 in which the integral skin covers the sides of the filler.

5. The cushion of claim 1 in which the skin covers the entire surface of the walls of said one or more openings.

6. The cushion of claim 1 in which there are a plurality of openings for ventilation, which cushion includes a rigid base with open areas therein in line with the bottoms of said openings through the filler.

7. The cushion of claim 6 in which the perimeter of the base substantially coincides with the perimeter of the filler and the integral skin covers the sides of the filler and the edge of said base.

8. The cushion of claim 4 which is a cushion for a vehicle, and there is an opening near at least one side edge of the cushion which, at least below the top portion of the cushion, is elongated with substantially parallel sides and is substantially parallel to said edge of the cushion to accommodate a seat belt.

9. The cushion of claim 8 which includes a plurality of openings distributed through the cushion for ventilation into which the integral skin extends.

10. The cushion of claim 9 in which below the top portion of the cushion, there is an opening which is elongated with sides substantially parallel to accommodate a seat belt, which opening widens in said top portion to form a pocket to accommodate a part of a seat-belt coupling.

11. The cushion of claim 9 in which the opening through the cushion and said pocket are completely covered with skin which is integral with said conforming skin.

12. The cushion of claim 1 which is a cushion for the back of an armchair, and there is at least one opening near one side edge of the cushion to accommodate an arm of the chair.

13. The cushion of claim 12 in which there are a plurality of openings distributed through the cushion for ventilation into which the integral skin extends.

14. A flexible plastic skin for a cushion which skin is distinct from the interior of the cushion and includes an expanse adapted to cover the top of the cushion, at least one opening in said expanse, a side skin portion at the perimeter of said expanse and integral therewith which is adapted to cover the side of the cushion, and for each opening an open-ended tubular skin portion integral with said expanse at the edge of the one or more openings which portion extends from the expanse in the same direction as said side skin portion.

15. The skin of claim 14 in which there are a plurality of open-ended tubular skin portions attached to said expanse and distributed throughout the expanse to cover ventilation openings through the cushion.

16. In an automobile, a seat with a cushion cover having at least one opening near one edge of the seat which opening extends completely through the cushion, said cover being an integral unit which extends down into the opening, and a seat belt extending through the opening.

17. The combination of claim 16 in which there is a part of a seat-belt coupling on the end of the seat belt which is above the top of the cushion, with the top of the opening larger in cross section than a lower portion and large enough to hold said part of the coupling.

18. The combination of claim 16 in which there are a plurality of ventilation openings which extend completely through the cushion, openings in the seat under said openings in the cushion, the cushion comprising a resilient filler with said integral cover extending at least partially through each of the openings therein.

19. An armchair with a back cushion having an opening in one edge thereof with a portion of the arm of the chair extending therethrough, the cushion being composed of resilient filler with a plastic covering over the filler and an integral portion of the covering extending through the opening.

References Cited

UNITED STATES PATENTS

| | | | |
|---|---|---|---|
| 2,012,042 | 8/1935 | Gerlofson et al. | 297—453 X |
| 2,232,646 | 2/1941 | Stone et al. | 5—361 X |
| 2,784,773 | 3/1957 | Rowland | 5—351 |
| 2,838,100 | 6/1958 | Follows | 297—421 |
| 2,872,706 | 2/1959 | Jordon | 18—39 |
| 3,929,104 | 3/1960 | Hutton | 18—39 |
| 3,091,496 | 5/1963 | Bentley | 297—386 |
| 3,133,853 | 5/1964 | Knox | 161—119 |
| 3,146,029 | 8/1964 | Gariepy | 297—421 X |
| 3,204,016 | 8/1965 | Sanger et al. | 264—45 |
| 3,287,750 | 11/1966 | Jessup | 5—355 |

FOREIGN PATENTS

| | | |
|---|---|---|
| 1,353,796 | 1/1964 | France. |
| 500,007 | 11/1954 | Italy. |

CASMIR A. NUNBERG, *Primary Examiner.*

UNITED STATES PATENT OFFICE

CERTIFICATE OF CORRECTION

Patent No. 3,381,999                       May 7, 1968

Frank W. Steere, Jr.

It is certified that error appears in the above identified patent and that said Letters Patent are hereby corrected as shown below:

Column 4, line 66, the claim reference numeral "9" should read -- 8 --; line 72, the claim reference numeral "9" should read -- 10 --.

Signed and sealed this 16th day of September 1969.

(SEAL)
Attest:

Edward M. Fletcher, Jr.                    WILLIAM E. SCHUYLER, JR.

Attesting Officer                           Commissioner of Patents